Patented Aug. 22, 1944

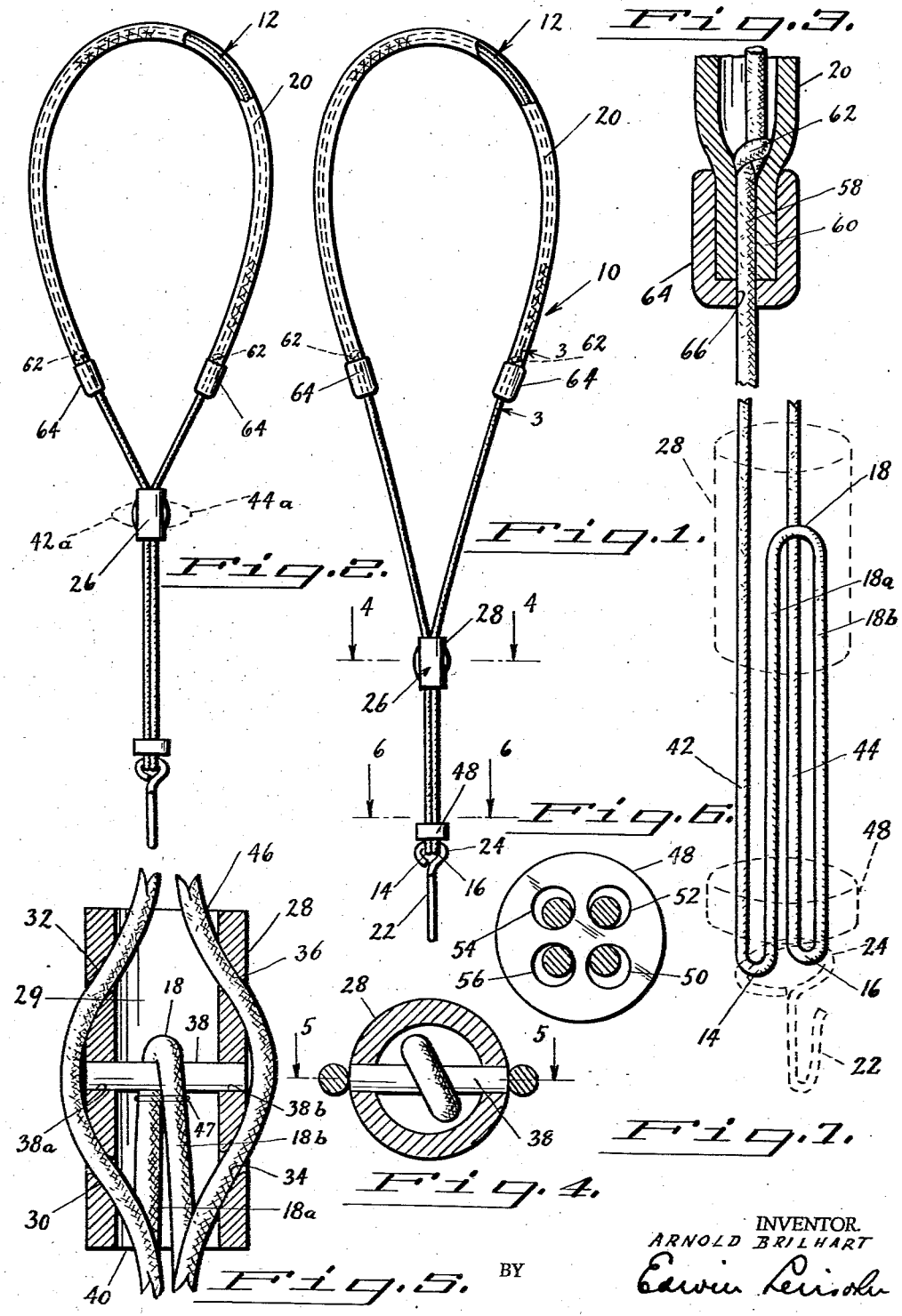

2,356,209

UNITED STATES PATENT OFFICE 2,356,209

ADJUSTABLE CORD

Arnold Brilhart, Great Neck, N. Y., assignor to Arnold Brilhart Ltd., a corporation of New York Application April 1, 1942, Serial No. 437,231

2 Claims. (Cl. 224—5)

This invention relates to adjustable cords. The cords embodying the present invention are intended primarily for use as supporting cords for saxophones or other musical instruments without, however, being limited to such use.

One object of the invention is to provide a cord having an adjusting device which is of simple construction, which can be easily operated to adjust the length of the cord and which is operative to effectively prevent unintended changes in the length of the cord.

Another object of the invention is to provide the cord with an adjusting device which while highly effective for its purpose, is relatively small, so as not to provide a bulky structure, and which furthermore does not detract from the appearance of the cord, these features being advantageous especially when the cord is used as hangers or supporting cords for saxophones or other musical instruments.

Another object of the invention is to provide the adjustable cord with means for holding portions of the cord adjacent the double looped end thereof in proper relation.

The above and other objects, features and advantages of the invention will be fully understood from the following description, reference being had to the accompanying illustrative drawing.

In the drawing:

Fig. 1 is a side view of an adjustable cord embodying the present invention;

Fig. 2 is a view similar to Fig. 1 showing the cord adjusted to decrease the length thereof;

Fig. 3 is an enlarged detail sectional view on the line 3—3 of Fig. 1;

Fig. 4 is a sectional view on the line 4—4 of Fig. 1;

Fig. 5 is a longitudinal sectional view on the line 5—5 of Fig. 4;

Fig. 6 is a sectional view on the line 6—6 of Fig. 1;

Fig. 7 is a perspective view, partly diagrammatic, illustrating the relation of parts of the cord to the adjusting device.

Referring now to the drawing in detail, the adjustable cord 10 embodying the present invention has at one end thereof a single loop 12 and at its opposite end a double loop constituted by the looped ends 14 and 16 as clearly apparent from an inspection of Figs. 1 and 7. Between said opposite ends of the cord, the latter is provided with an intermediate loop 18. As here shown, the single looped end 12 of the cord is covered by a tubular braided flexible leather strap 20 which is passed around the neck of the wearer when the adjustable cord is used as a supporting cord for saxophones or other musical instruments. A hook 22 is carried at the opposite end of the cord and has an eyelet 24 in which the looped end portions 14 and 16 of the cord are movably engaged. It will be understood that hook 22 is adapted to engage in an eye provided for that purpose on the saxophone.

The cord having its opposite ends looped and provided with a loop intermediate its ends is provided with an adjusting device 26 by which the length of the cord can be easily adjusted and which acts to prevent unintended variations in the length of the cord. Said adjusting device comprises a tubular member 28 which may be made of metal, of a plastic, or of any other suitable material. While said tubular member 28 is here shown as cylindrical, it can be of any other peripheral contour. Said tubular member 28 is provided with two pairs of openings through the side wall thereof passing from the exterior of said member to the interior axial bore 29 thereof. The companion openings of one pair are indicated at 30 and 32 and the companion openings of the other pair are indicated at 34 and 36, and it will observed that the companion openings of each pair are spaced from each other longitudinally of the tubular member and that said pairs of openings are in spaced relation peripherally of said member and preferably so that openings 30 and 34 are in diametrically opposed relation and so that openings 32 and 36 are similarly in diametrically opposed relation. Said openings are preferably inclined, as illustrated in Fig. 5, and are rounded at their opposite ends in order to facilitate movement of the cord therethrough and to avoid fraying the cord. A pin 38 is carried by tubular member 28 in position across the bore of said tubular member and between the openings of each of said pair. Preferably the outer ends of pin 38 lie flush with the outer surface of said tubular member, said outer ends being fixed in companion openings 38a and 38b, preferably by a forced fit of said ends in said openings, respectively.

The intermediate looped portion 18 of the cord engages around pin 38, and the longitudinal portions 18a and 18b of the cord extend from said intermediate loop 18 and pass through one open end 40 of tubular member 28 to the looped ends 14 and 16, respectively, at the double-looped end of the cord from which the cord lengths 42 and 44, respectively, pass upwardly into tubular member 28 through said open end 40 thereof, then through openings 30—32 and 34—36, respectively, and then out of the tubular member through the opposite open end 46 thereof to the adjacent portions, respectively, of the single loop 12 of the cord. Portions 18a and 18b of the cord are tied together adjacent pin 38 in any suitable way, as by a thread 47, in order to prevent movement of looped portion 18 circumferentially of said pin. This prevents displacement of loop 12 and member 20 from their symmetrical position at the end of the cord.

An eyelet member 48 is provided adjacent the double looped end of the cord for holding the four lengths of the cord in proper relation adjacent the double looped end of the cord. For this purpose said eyelet member 48 is provided with four openings 50, 52, 54 and 56 through which corresponding portions of the cord pass during the adjustment of the cord. Eyelet 48 can be made of any suitable material such as metal, plastics, etc.

As shown in Fig. 2, the loop 12 of the cord passes continuously through the tubular member 20 from one end to the other end thereof. Portions 58 of the cord are gripped by the constricted end portions 60 of member 20 and knots or other enlargements 62 are provided in the cord adjacent said constricted end portions 60 of member 20. One of the knots 62 can be provided by the knot which is formed when the opposite ends of the cord are tied together after threading the cord through members 20, 22, 28 and 48. Each end portion 60 of the strap is held constricted by the cup-shaped ferrule 64 forced onto said end portion or molded thereon from a suitable plastic. By this construction the weight of the instrument on hook 22 is taken up both by the loop 12 and member 20 and relative movement of loop 12 and member 20, except that due to a slight stretching under tension, is prevented. It will be understood that member 20 can be formed of any suitable material and can be of any suitable width so that it is comfortable to the user when in position around the latter's neck.

The length of the cord is adjusted by sliding tubular member 28 longitudinally of the cord between the single and double looped ends thereof. It will be understood that the cord is increased in length by moving tubular member 28 toward the double looped end of the cord and that conversely the length of the cord is decreased by moving said tubular member toward the single looped end of the cord. It will be readily understood that the cord is increased in length by shortening the double looped portion of the cord below member 26 and that the cord is decreased in length by increasing the length of the double looped portion below said member 28. Thus, as illustrated in Fig. 2 if the withdrawn portions 42a and 44a are drawn through openings 30 and 34, respectively, and through open end 40 of tubular member 28 the length of the cord is decreased while, on the other hand, if said portions 42a and 44a are withdrawn through openings 32, 36 and through open end 46 of member 28 the effective length of the cord is increased. When it is desired to increase the length of the cord this can be readily done by pulling member 28 away from the ends of strap 20, this operation being facilitated by holding the ferrules 64 between the fingers of one hand and the tubular member 28 between the fingers of the other hand. To decrease the length of the cord the hook 22 is held between the fingers of one hand and the tubular member is grasped between the fingers of the other hand and pulled in a direction away from hook 22. It is impossible either to increase or to decrease the length of the cord by pulling on the opposite ends thereof and on that account the weight of the saxophone or other musical instrument is effectively sustained without any increase in the length of the cord.

While I have shown and described the preferred embodiment of my invention, it will be understood that the latter may be embodied otherwise than as herein specifically shown or described and that in the illustrated embodiment certain changes in the details of construction and in the form or shape of the parts may be made. Therefore, I do not wish to be limited to the construction herein shown or described except to the extent which may be required by the scope of the appended claims.

Having thus described my invention, what I claim and desire to secure by Letters Patent is:

1. An adjustable instrument-supporting cord shaped as an elongated closed curve, part of said cord folded back upon itself so as to form a single loop at one end thereof, a double loop at its opposite end, and a single loop intermediate its opposite ends, and provided with means for adjusting the length of the cord between its said opposite ends, said means comprising a tubular member open at both ends thereof and having two pairs of openings in its side wall, the companion openings of each pair being spaced from each other longitudinally of said tubular member and the pairs of openings being in spaced relation peripherally of said member, a pin carried by said tubular member in position across the bore thereof and secured to the wall of said tubular member between each pair of said openings, said intermediate loop of the cord engaging around said pin and emerging in two strands through the lower end of said tubular member, said strands extending downwardly for a distance, then folding back upon themselves to form said double loop, each of the folded-back strands re-entering the lower end of said tubular member, emerging through the lower one of said pairs of openings in the side wall of the tubular member, re-entering the tubular member through the upper or companion opening and emerging through the upper end of said tubular member, the two strands thus emerging through said upper end being joined to form said first mentioned single loop.

2. An adjustable instrument-supporting cord shaped as an elongated closed curve, part of said cord folded back upon itself so as to form a single loop at one end thereof, a double loop at its opposite end, and a single loop intermediate its opposite ends, and provided with means for adjusting the length of the cord between its said opposite ends, said means comprising a tubular member open at both ends thereof and having two pairs of openings in its side wall, the companion openings of each pair being spaced from each other longitudinally of said tubular member and the pairs of openings being in spaced relation peripherally of said member, a pin carried by said tubular member in position across the bore thereof and secured to the wall of said tubular member between each pair of said openings, said intermediate loop of the cord engaging around said pin and emerging in two strands through the lower end of said tubular member, said strands extending downwardly for a distance, then folding back upon themselves to form said double loop, each of the folded-back strands re-entering the lower end of said tubular member, emerging through the lower one of said pairs of openings in the side wall of the tubular member, re-entering the tubular member through the upper or companion opening and emerging through the upper end of said tubular member, the two strands thus emerging through said upper end being joined to form said first mentioned single loop, each of said openings being inclined toward the axes of said tubular member, the outer ends of the openings of each pair being closer to each other than the inner ends thereof.

ARNOLD BRILHART.